United States Patent
Kristensen

(10) Patent No.: US 8,533,686 B2
(45) Date of Patent: Sep. 10, 2013

(54) METHODS AND SYSTEMS FOR PORTING SYSPROF

(75) Inventor: Kristian Hoegsberg Kristensen, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 1614 days.

(21) Appl. No.: 11/763,389

(22) Filed: Jun. 14, 2007

(65) Prior Publication Data
US 2008/0313406 A1    Dec. 18, 2008

(51) Int. Cl.
- G06F 9/44 (2006.01)
- G06F 9/45 (2006.01)
- G06F 11/30 (2006.01)
- G06F 15/173 (2006.01)
- G06F 11/00 (2006.01)
- G06F 12/16 (2006.01)

(52) U.S. Cl.
USPC ........... 717/130; 717/101; 717/122; 717/124; 717/128; 717/138; 717/153; 702/182; 709/223; 714/39; 726/25

(58) Field of Classification Search
None
See application file for complete search history.

(56) References Cited

U.S. PATENT DOCUMENTS

| | | | | |
|---|---|---|---|---|
| 4,016,545 A * | 4/1977 | Lipovski | ....................... | 711/100 |
| 6,598,012 B1 * | 7/2003 | Berry et al. | .................... | 717/130 |
| 6,604,210 B1 * | 8/2003 | Alexander et al. | .............. | 714/39 |
| 6,658,652 B1 * | 12/2003 | Alexander et al. | ............ | 717/128 |
| 6,751,789 B1 * | 6/2004 | Berry et al. | .................... | 717/130 |
| 7,389,497 B1 * | 6/2008 | Edmark et al. | ................ | 717/130 |
| 7,571,427 B2 * | 8/2009 | Wang et al. | .................... | 717/122 |
| 7,693,976 B2 * | 4/2010 | Perry et al. | ..................... | 709/223 |
| 2002/0099760 A1 * | 7/2002 | Liang | ............................ | 709/107 |
| 2002/0108107 A1 * | 8/2002 | Darnell et al. | ................ | 717/153 |
| 2003/0204838 A1 * | 10/2003 | Caspole et al. | ............... | 717/130 |
| 2004/0117760 A1 * | 6/2004 | McFarling | ..................... | 717/101 |
| 2004/0163077 A1 * | 8/2004 | Dimpsey et al. | .............. | 717/130 |
| 2005/0086650 A1 * | 4/2005 | Yates et al. | ..................... | 717/139 |
| 2005/0155026 A1 * | 7/2005 | DeWitt et al. | ................. | 717/158 |

(Continued)

OTHER PUBLICATIONS

Eric James Lorden, A Secure Software Platform for Real-Time Embedded Systems, 2006, [Retrieved on Dec. 13, 2012]. Retrieved from the internet: <URL: http://scholar.lib.vt.edu/theses/available/etd-12192006-112012/unrestricted/elorden_masters.pdf> 101 Pages (1-83).*

Michael D. Bond et al., Probabilistic Calling Context, Oct. 2007, [Retrieved on Dec. 13, 2012]. Retrieved from the internet: <URL: http://dl.acm.org/citation.cfm?id=1297027.1297035> 15 Pages (97-112).*

Primary Examiner — Don Wong
Assistant Examiner — Anibal Rivera
(74) Attorney, Agent, or Firm — Lowenstein Sandler LLP

(57) ABSTRACT

Embodiments of the present invention provide a system profiler that can be used on any processor architecture. In particular, instead of copying an entire stack every time, the stack is divided into blocks of a fixed size. For each block, a hash value is computed. As stack blocks are sent out of the kernel, the hash value and a copy of the block contents is kept in a user space cache. In the kernel, the hash codes of sent stack blocks are tracked in a table. During system profiling, the kernel module sampling the call stack determines if that stack block was previously sent by checking for the hash value in the kernel table. If the hash matches an entry in the kernel table, then only the hash value is sent. If the hash value is not in the table, the entire block and the hash value is sent.

21 Claims, 3 Drawing Sheets

(56) References Cited

U.S. PATENT DOCUMENTS

| | | |
|---|---|---|
| 2006/0070046 A1* | 3/2006 | Balakrishnan et al. ....... 717/138 |
| 2006/0075386 A1* | 4/2006 | Loh et al. ...................... 717/124 |
| 2007/0043531 A1* | 2/2007 | Kosche et al. ................ 702/182 |
| 2007/0083933 A1* | 4/2007 | Venkatapathy et al. ......... 726/25 |
| 2007/0285271 A1* | 12/2007 | Erlingsson et al. ...... 340/815.84 |
| 2007/0288908 A1* | 12/2007 | Cain et al. ..................... 717/130 |
| 2009/0222803 A1* | 9/2009 | Bratanov ....................... 717/155 |

* cited by examiner

METHODS AND SYSTEMS FOR PORTING SYSPROF

FIELD OF THE INVENTION

The present invention relates to tools for profiling software.

BACKGROUND OF THE INVENTION

Sysprof is a sampling processor profiler for Linux that uses a kernel module to profile the entire system, not just a single application. Sysprof handles shared libraries and applications do not need to be recompiled. In fact they don't even have to be restarted. Sysprof is a kernel module that can be easily inserted into the operating system and started. Thus, Sysprof and tools like it have been very useful in Linux development.

Sysprof works by generating stack backtraces for the currently running process at approximately 200 times a second. The backtraces are generated in the kernel and sent to an application which collects and analyzes the backtraces to generate a detailed call graph. The callgraph includes information on how much time the system spent in various functions in the applications running during the profile period.

However, one limitation of Sysprof is that it only works on Intel's x86 family of processors. The x86 limitation comes from the fact that stack traces are difficult to produce on anything other than x86 processors. On all other architectures faulty heuristics or third party libraries must be used to obtain debug information loaded from files. Unfortunately, neither of these solutions provides the profiling capabilities, especially from inside the kernel, as well as Sysprof.

Accordingly, it would be desirable to provide a system profiling tool, like Sysprof, for a variety of architectures. It would also be desirable to provide a way to port a system profiling tool, like Sysprof, to architectures other than x86 processors.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a system profiler that can be used on any processor architecture. In particular, instead of copying an entire stack every time, the stack is divided into blocks of a fixed size. For each block, a hash value is computed. As stack blocks are sent out of the kernel, a copy is made in user space and the hash codes of send stack track blocks are tracked in a kernel table. During system profiling, the kernel module sampling the call stack determines if that stack block was previously sent by checking for the hash value in the kernel table. If the hash matches an entry in the kernel table, then only the hash value is sent. If the hash value is not in the table, the entire block and the hash value is sent.

This approach of the present invention has several advantages. First, the kernel only stores the hash values for blocks copied to user space, not the entire blocks. This minimizes the memory and processing overhead of the present invention. In addition, during execution, much of the initial part of a stack is not expected to change significantly. Thus, the present invention can employ block "sharing" for the stable part of the stack. Furthermore, threads of the same process often share the same initial part of a stack and thus block sharing of the present invention can again be employed.

Reference will now be made in detail to the exemplary embodiments of the invention, which are illustrated in the accompanying drawings. Wherever possible, the same reference numbers will be used throughout the drawings to refer to the same or like parts.

Figure 1:
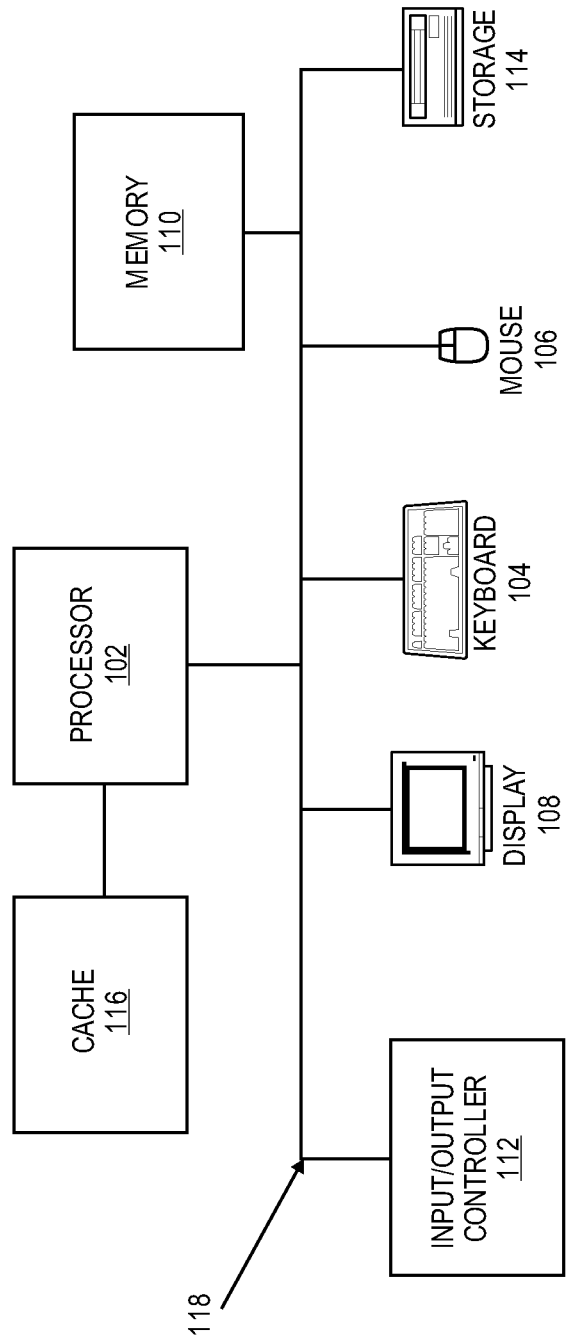
FIG. 1 illustrates an exemplary system in which the present invention may be employed.

FIG. 1 illustrates a computer system 100 that is consistent with the principles of the present invention. For purposes of explanation, FIG. 1 illustrates a general purpose computer, such as a personal computer, which may implement embodiments of the present invention. Examples of the components that may be included in computer system 100 will now be described.

As shown, a computer system 100 may include a central processor (CPU) 102, a keyboard 104, a pointing device 106 (e.g., mouse, or the like), a display 108, a main memory 110, an input/output controller 112, and a storage device 114. Processor 102 may further include a cache memory 116 for storing frequently accessed information and graphics processing unit 118. Cache 116 may be an "on-chip" cache or external cache. System 100 may also be provided with additional input/output devices, such as a printer (not shown). The various components of the system 100 communicate through a system bus 118 or similar architecture.

Figure 2:
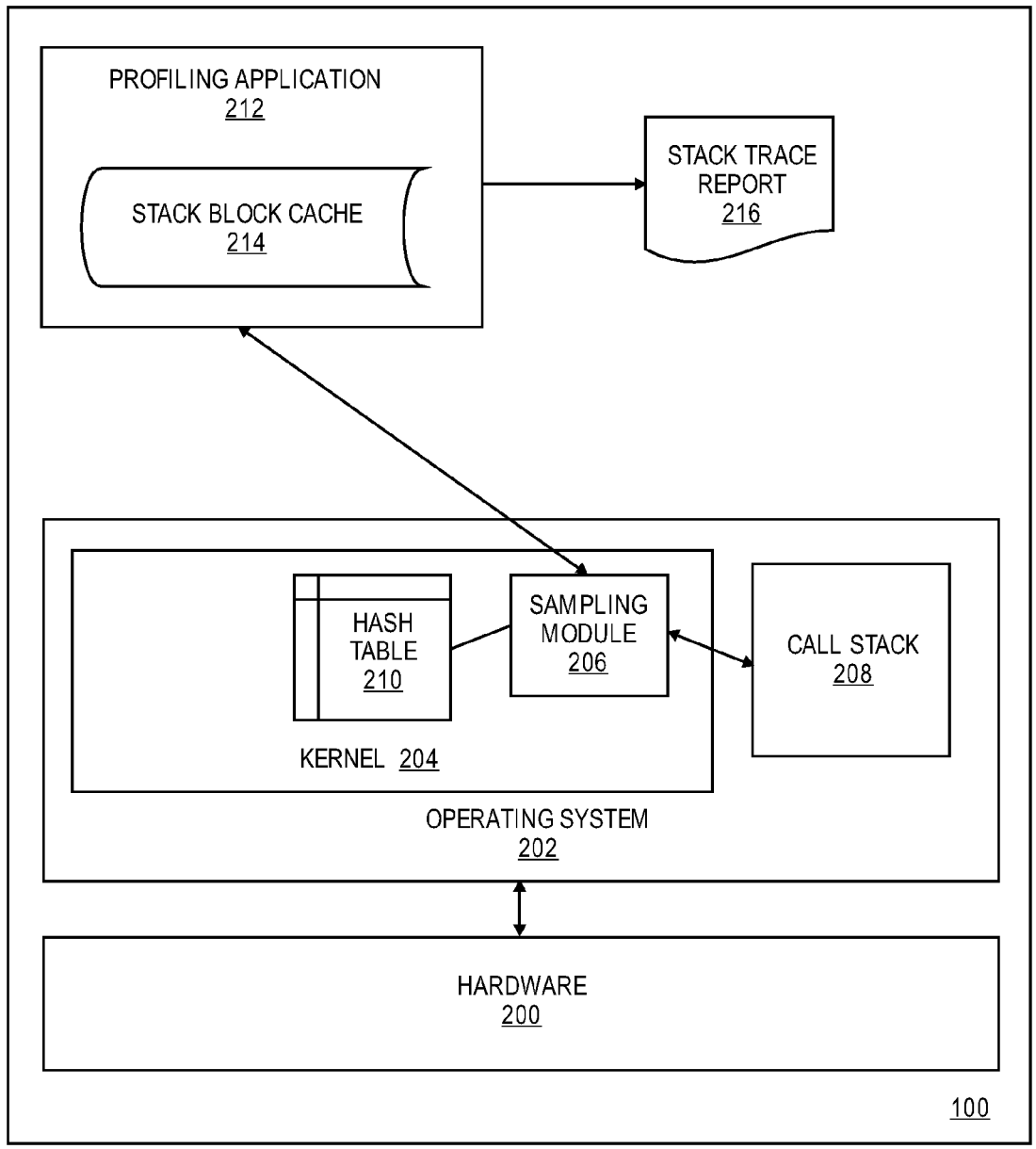
FIG. 2 illustrates an exemplary software architecture for the present invention.

FIG. 2 illustrates an exemplary software architecture for the present invention. As shown, system 100 comprises hardware 200 (as shown in FIG. 1) and, when running, may comprise an operating system 202 having a kernel 204, a sampling module 206, a call stack 208, a hash table 210, and a profiling application 212. These components will now be briefly described.

Operating system 200 is a set of programs that manage the hardware 200 (as shown in FIG. 1) and software resources of system 100. For example, operating system 200 may performs tasks, such as controlling and allocating memory, prioritizing system requests, controlling input and output devices, and managing file systems. Several operating systems are well known to those skilled in the art, such as Windows from the Microsoft Corporation, Linux, Unix, Mac OS from Apple Computer Corporation, and the like.

Of note, in order to manage access to memory 110, operating system 202 may use the well known concept of virtual memory for managing running processes and applications. In virtual memory, operating system 202 divides the virtual memory into kernel space and user space. Kernel space is strictly reserved for running kernel 204, device drivers (etc.), etc. In contrast, user space is the area of virtual memory where all user mode applications (not shown) and profiling application 212 will work. This area of memory may be swapped out to storage device 114 when necessary. Each process and application running on system 100 will normally runs in its own virtual memory space.

Kernel 204 is the central component of operating system 202. Kernel 204 has several general responsibilities including managing hardware 200 and the communication between hardware 200 and the software running on system 100. For example, for processor 102, kernel 204 decides time which of the running programs should be allocated for service.

Sampling module 206 is a kernel module that that profiles the operation of kernel 204 and all applications running on the system 100 and provides the information to profiling application 212. In particular, sampling module 206 is configured to sample call stack 208 and send sample information to profiling application 212. In some embodiments, sampling module 206 may be a kernel module that can be inserted into operating system 202 and started without interrupting the other operations of system 100. Further details of the operation of sampling module 206 are provided below.

Call stack 208 is a stack which stores information about the active subroutines of an application running on system 100. Active subroutines are those which have been called but have not yet completed execution by returning. One skilled in the art will recognize that call stack 208 may also be known as an execution stack, a control stack, a function stack, or a run-time stack.

Call stack 208 is sampled by sample module 206 because it contains information about which subroutine is currently executing and the call trace that lead the application to that subroutine. Call stack 208 is organized such that a calling subroutine pushes the return address onto the stack, and the called subroutine, when it finishes, pops the return address off the call stack (and transfers control to that address). If a called subroutine calls on to yet another subroutine, it will push its return address onto call stack 208, and so on, with the information stacking up and unstacking as the program dictates.

Although FIG. 2 shows a single call stack 208, there is usually a call stack associated with each running program. Additional call stacks may also be created for signal handling or multitasking.

Sampling call stack 208 may also be useful for system profiling because it may serve other functions depending on the language, operating system, and machine environment. For example, call stack 208 may be a memory space for a subroutine. A subroutine frequently needs memory space for storing the values of local variables. However, these variables are known only within the active subroutine and do not retain values after it returns. Therefore, space in call stack 208 may be allocated for this use by simply moving the top of the stack by enough to provide the space.

Call stack 208 may also contain information about parameter passing. Subroutines often require that values for parameters be supplied to them by the code which calls them, and it is not uncommon that space for these parameters may be allocated in call stack 208.

However, typically for call stack 208, the stack frame at the top is for the currently executing routine. The stack frame includes space for the local variables of the routine, the return address back to the routine's caller, and the parameter values passed into the routine. The memory locations within a frame are often accessed via a register (not shown) called the stack pointer, which also serves to indicate the current top of the stack. Alternatively, memory within the frame may be accessed via a separate register (not shown) known as the frame pointer. The frame pointer points to some fixed point in the frame structure, such as the location for the return address.

Of note, stack frames in call stack 208 are not all the same size. Different subroutines have differing numbers of parameters, so that part of the stack frame will be different for different subroutines, although usually fixed across all activations of a particular subroutine. Similarly, the amount of space needed for local variables will be different for different subroutines, thus resulting in different sizes of stack frames. In addition, where dynamic allocations of memory for local variables on the stack are used, the size of the local area will vary from activation to activation of a subroutine causing the stack frame in call stack 208 to vary in size.

Hash table 210 provides a data structure indicating when samples of call stack of 208 have been sent to profiling application. In particular, hash table 210 provides a listing of which blocks of call stack 208 have been sent by sampling module 206. In some embodiments hash table 210 is stored in kernel space by operating system 202. In addition, hash table 210 may be updated or refreshed at various times. For example, hash table 210 may be updated each time a sample is sent by sampling module 206. Alternatively, hash table 210 may be refreshed based on a time interval.

Profiling application 212 may be a user space application that collects the information gathered by sampling module 206 and prepares an output for the user. Profiling application 212 may also provide an interface to allow the user to specify various options, such as timeframes of profiling, display formats, output formats, etc. Such user interfaces are well known to those skilled in the art.

Stack block cache 214 serves as a cache of previously sent samples of call stack 208. As noted, during execution, much of the initial part of call stack 208 is not expected to change significantly. Thus, profiling application 212 and sampling module 202 may employ sample block "sharing" for the stable part of call stack 208. Furthermore, threads of the same process may often share the same initial part of call stack 208, and thus, profiling application 212 and sampling module 202 may employ block sharing in these circumstances as well.

Stack trace report 216 is a report of the active stack frames instantiated in call stack 208 by the execution of a program. One skilled in the art will recognize that profiling application 212 may generate stack trace report 216 for execution anywhere within a program.

Figure 3:
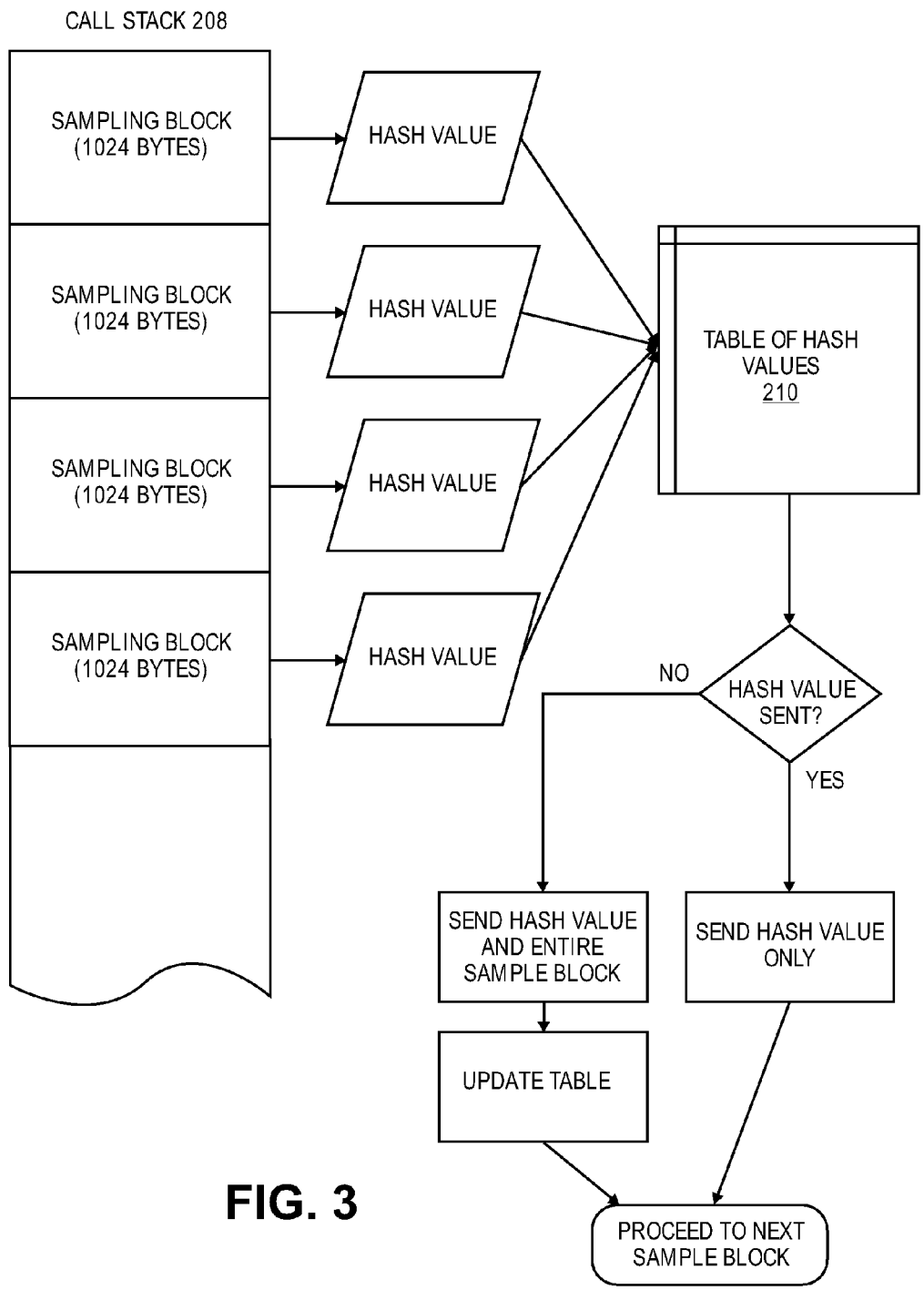
FIG. 3 illustrates an exemplary process flow that is consistent with the principles of the present invention.

FIG. 3 illustrates an exemplary process flow that is consistent with the principles of the present invention. First, sampling module 206 is started and accesses call stack 208. Sampling module 206 then divides call stack into fixed size blocks, for example, to assist in the speed of sampling. As noted above, this may be advantageous since frames in call stack 208 may vary in size. One skilled in the art will recognize that various block sizes may be used depending on specifics of hardware 200, processor 102, etc. For example, in one embodiment, sampling module 206 divides call stack 208 into blocks of 1024 bytes. Other block sizes, such as 32, 64, 128 and 256 bytes may also be used in the present invention.

Next, sampling module 206 calculates hash values for each of the blocks. For example, sampling module 206 may use a well known hash function, such as MD5, SHA-1, crc32 or adler32. Of course any hashing algorithm may be employed by sampling module 206. Of note, for a given block size, in choosing the right algorithm, there is a tradeoff to be made between speed of the algorithm and data integrity. For big blocks, a stronger hash function is need, but will be more expensive to compute and will produce a bigger hash value.

Sampling module 206 then proceeds to sample call stack 208 to monitor for changes. For example, sampling module 206 may sample call stack 208 relatively frequently, such as approximately 200 times per second.

As sampling module 206 sends samples of call stack 208, profiling application 212 will cache copies of the stack blocks in stack block cache 214 as well as their corresponding hash values. If profiling application 212 receives the block itself, then it will use that information in generating stack trace report 216. However, when profiling application receives only a hash value from sampling module 206, then profiling application 212 will look up the appropriate copy of the block based on the hash value. This concept of the present invention is known as "block sharing."

For each block in a sample, sampling module 206 determines if that particular block was previously sent. For example, sampling module 206 may check the hash value of each block against entries in hash table 210. As noted, as sampling module 206 sends samples of call stack 208 to profiling application 212, it may update the entries of hash table 210 with the hash values of blocks in that sample. Hence, if some or all of sample of call stack 208 has been stable from the previous sample, then sampling module 206 may simply send the hash values rather than the contents of call stack 208 itself.

Accordingly, if the hash value for a particular block in a sample matches an entry in hash table 210, then sampling module 206 may send just the hash value for that block. At profiling application 212, it will use this hash value to look up the save copy of the block in stack block cache 214.

However, if the hash value for a particular block in a sample does not match an entry in hash table 210, then sampling module 206 will send both the hash value and the block. Sampling module 206 will also update hash table 210 to indicate that this new block has been sent to profiling application 212.

Sampling module 206 will then proceed to the next sample and next set of blocks of call stack 208. Meanwhile, profiling application 212 will generate stack trace report 216 based on the information from these samples.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    selecting, by a computer system, a block from a call stack, wherein every block of the call stack is a fixed-size block, and wherein each block of the call stack stores a return address and a set of local variable values for a respective subroutine of an executing program; and
    when the selected block was previously sent to an application executed by the computer system, sending a hash value for the selected block to the application without sending the selected block to the application.

2. The method of claim 1, further comprising dividing the call stack into fixed-size blocks.

3. The method of claim 1, further comprising calculating hash values for each of the blocks.

4. The method of claim 3, wherein the hash values are one of MD-5 hash values and SHA-1 hash values.

5. The method of claim 3, wherein the hash values are CRC32 hash values.

6. The method of claim 3, wherein the hash values are Adler32 hash values.

7. The method of claim 1, further comprising determining whether the selected block was previously sent to the application by checking a table of hash values.

8. The method of claim 1, further comprising determining whether the selected block was previously sent to the application by checking a kernel table of hash values.

9. The method of claim 1, further comprising sending the hash value for the selected block and the selected block to the application when the selected block was not previously sent to the application.

10. A system comprising:
    a call stack, wherein every block of the call stack is a fixed-sized block, and wherein each block of the call stack stores a return address and a set of local variable values for a respective subroutine of an executing program; and
    a processor to:
        select a block from the call stack, and
        send, when the selected block was previously sent to an application executed by the computer system, a hash value for the selected block to the application without sending the selected block to the application.

11. The system of claim 10, wherein the processor is also to divide the call stack into fixed-size blocks.

12. The system of claim 10, wherein the processor is also to calculate hash values for the fixed-size blocks.

13. The system of claim 12, wherein the hash values are SHA-1 hash values.

14. The system of claim 12, wherein the hash values are CRC32 hash values.

15. The system of claim 12, wherein the hash values are one of MD5 hash values and Adler32 hash values.

16. The system of claim 10, wherein the processor is also to execute a profiling application that profiles operations of the system based on samples of the call stack.

17. The system of claim 10 wherein the processor is also to determine whether the selected block was previously sent to the application by checking a table of hash values.

18. The system of claim 17, wherein the processor is also to send the hash value for the selected block and the selected block to the application when the hash value for the selected block does not match an entry in the table of hash values.

19. The system of claim 16, wherein the processor is also to execute a sampling module that samples the call stack and sends blocks and hash values to the profiling application, and wherein the profiling application copies blocks it receives from the sampling module into a user space cache.

20. The system of claim 19, wherein the profiling application retrieves a copy of a block from the user space cache when the profiling application receives only a hash value from the sampling module.

21. The system of claim 10, wherein the processor is capable of generating a stack trace via instructions stored in kernel space.

* * * * *